United States Patent [19]
Ericsson et al.

[11] Patent Number: 5,509,056
[45] Date of Patent: Apr. 16, 1996

[54] METHOD AND APPARATUS FOR EXECUTING AUTOMATIC CALLING CARD ACCESS IN CELLULAR TELEPHONES

[75] Inventors: Ted G. Ericsson; Nils R. Rybeck, both of Cary, N.C.; Björn Krylander, Svedala, Sweden

[73] Assignee: Ericsson GE Mobile Communications Inc., Research Triangle Park, N.C.

[21] Appl. No.: 254,873

[22] Filed: Jun. 6, 1994

[51] Int. Cl.⁶ .................. H04M 17/00; H04M 15/00; H04M 11/00
[52] U.S. Cl. .............. 379/144; 379/114; 379/130; 379/58; 379/59
[58] Field of Search ................. 379/91, 96, 112, 379/113, 114, 120, 131, 144, 58, 59, 60, 61

[56] References Cited

U.S. PATENT DOCUMENTS

| | | | |
|---|---|---|---|
| 4,475,013 | 10/1984 | Lee et al. | 379/131 X |
| 4,751,728 | 6/1988 | Treat | 375/113 |
| 5,272,748 | 12/1993 | Davis | 379/144 X |

OTHER PUBLICATIONS

OKI 1150 Handheld Telephone User's Guide and Warranty, OKI Telecom, Suwanee, Ga., pp. 24, 26, 31.

*Primary Examiner*—Stephen Chin
*Assistant Examiner*—Paul Loomis
*Attorney, Agent, or Firm*—Burns, Doane, Swecker & Mathis

[57] ABSTRACT

A method of placing a calling account card telephone call on a call by call basis using one of a plurality of carrier networks is disclosed. The method includes the steps of storing a plurality of data sets in accordance with requirements for use of the carrier networks, detecting the initiation of each telephone call by recognizing a first predetermined sequence input by the user and detecting the initiation of each calling card call by recognizing a second predetermined sequence input by the user, the second predetermined sequence being different than the first predetermined sequence, retrieving one of the stored data sets responsive to the detected second predetermined sequence, and automatically initiating a telephone call in accordance with the retrieved stored data sets responsive to inputting of the second predetermined sequence. An apparatus for automatic execution of a telephone calling card call on a call by call basis using one of a plurality of carrier networks is also provided.

22 Claims, 6 Drawing Sheets

METHOD AND APPARATUS FOR EXECUTING AUTOMATIC CALLING CARD ACCESS IN CELLULAR TELEPHONES

BACKGROUND

The invention relates generally to calling card dialing for cellular telephones and more specifically to a method and apparatus for automatic execution of same.

Calling cards are issued, for example, to subscribers of long distance service so that they may access a long distance carrier from any local network. The primary advantage to having a calling card account is the ability to make long distance calls at favorable rates through any local exchange. Consolidation of billing is yet another advantage. Known procedures for making calls with a calling card account require that the subscriber dial a predetermined number to access the independent carrier network. A successful connection to the carder network is usually signified by the transmission of a tone or prompt. Upon receipt of this tone or prompt, the user or subscriber then dials the telephone number of the call to be placed. The carrier network then responds with another prompt to the subscriber to enter a verification code depending on the card used. If the user responds with a valid number, the desired connection is then completed through the independent carrier network.

By the way, for purposes of this discussion, the terms user and subscriber are used interchangeably. It is understood that the user need not be a subscriber to a particular carrier network, he/she can be the person who is using the telephone at a given time.

A disadvantage to the usage of a calling card account is that the procedure required to complete a call requires many keystrokes. The user must also be able to recall both the access number and the user identification number to successfully make use of the service. With regard to the use of calling card accounts on cellular mobile telephones, it is a matter of safety and convenience to reduce as much as possible the number of keystrokes required for making a call. A problem can arise, particularly in cellular telephones used in automobiles, where it is dangerous to divert the driver's attention from the road to the telephone. As an additional benefit, any simplification to the procedure for placing calls through a calling card account would likely result in increased usage thereof and a maximum of cost savings.

It is desirable to provide a simple, automatic procedure that would allow a user to place calling card calls. That each carrier may have a different procedure for executing calling card calls presents a challenge to the automation of the procedure. This is further complicated by the need to make any sequence of operations easy to program by a novice user. Some cellular telephones have one (or more) special memory locations intended to be used for calling card codes (the contents of such can be changed or viewed by first entering a personal code). The OKI 1150 Handheld Telephone User's Guide and Warranty, OKI Telecom, Suwanee, Ga., pp. 24, 26, 31, describes a calling card mode which can be entered from a menu. Once in the calling card mode, all successive numbers are automatically charged to a preprogrammed sequence, until the calling card mode is turned off. This operation is disadvantageous because the mode must be turned on to make long distance calls and turned off before attempting to make non-calling card calls. If the mode is not disabled, an error may result and some calls will be erroneously billed to the credit card.

It is desirable to provide an automatic calling card sequence which does not require a special mode. It is also desirable to provide an initial sequence which alerts the telephone to the automatic calling card sequence. It is further desirable to provide an automatic calling card sequence which is easy to invoke and is only valid for each time the sequence is initiated.

SUMMARY OF THE INVENTION

The present invention provides a method and apparatus for automatically placing calls through a calling card account. The access number and verification data stream may be preprogrammed into predetermined storage or memory locations for automatic retrieval when a predetermined sequence is initiated by the user. In addition, the present invention provides for easy programming of a predetermined sequence for completing calls through various calling card accounts. The present invention provides a plurality of storage locations for storing calling card information for one or more calling cards. A different predetermined sequence is used to access the calling card information stored in each storage location. The telephone then determines which procedure it has to follow to gain access to the desired network based on the predetermined sequence used.

According to one embodiment, an apparatus for automatic execution of a telephone calling card call on a call by call basis using one of a plurality of carrier networks is provided. The apparatus comprises memory means for storing a plurality of data sets in accordance with requirements for use of the carrier networks, user input means for initiating each telephone call using a first predetermined sequence and for initiating each calling card call using a second predetermined sequence, the second predetermined sequence being different than the first predetermined sequence, means for retrieving one of the stored data sets responsive to the second predetermined sequence, and means for automatically initiating a telephone call in accordance with the retrieved stored data set responsive to entering of the second predetermined sequence by the user input means.

According to another aspect of the present invention, a method of placing a calling account card telephone call on a call by call basis using one of a plurality of carrier networks is provided. The method comprises the steps of storing a plurality of data sets in accordance with requirements for use of the carrier networks, detecting the initiation of each telephone call by recognizing a first predetermined sequence input by the user and detecting the initiation of each calling card call by recognizing a second predetermined sequence input by the user, the second predetermined sequence being different than the first predetermined sequence, retrieving one of the stored data sets responsive to the detected second predetermined sequence, and automatically initiating a telephone call in accordance with the retrieved stored data sets responsive to inputting of the second predetermined sequence.

According to another aspect of the present invention an apparatus for automatic execution of a telephone calling card call on a call by call basis using one of a plurality of carrier networks is provided. The apparatus comprises memory means for storing at least one access number, the at least one verification data stream and at least one flow process to be performed in accordance with requirements for use of the carrier networks, and first user input means for inputting the at least one access number and the at least one verification data stream to be stored in said memory means, and for modifying the at least one flow process. The apparatus further comprises second user input means for initiating each telephone call using a first predetermined sequence and for initiating each calling card call using a second predetermined sequence, the second predetermined sequence being different than the first predetermined sequence, means for determining a telephone number to be called, means for retrieving one of at least one access numbers, one of the verification data streams, and one of the stored flow processes responsive to the second predetermined sequence, and means for automatically initiating a telephone call to the telephone number according to the retrieved stored flow process responsive to entering of the second predetermined sequence by the second user input means.

According to another aspect of the present invention, a method of placing a calling account card telephone call on a call by call basis using one of a plurality of carrier networks is provided. The method comprises the steps of storing at least one flow process to be performed in accordance with requirements for use of the carrier networks, inputting, via user input means, at least one access number and at least one verification data stream, providing a menu option to allow a user to modify the at least one flow process, storing the at least one access number and the at least one verification data stream input by the user input means, detecting the initiation of each telephone call by recognizing a first predetermined sequence input by the user and detecting the initiation of each calling card call by recognizing a second predetermined sequence input by the user, the second predetermined sequence being different than the first predetermined sequence, determining a telephone number to be called, retrieving one of at least one access numbers, one of the verification data streams, and one of the stored flow processes responsive to the detected second predetermined sequence, and automatically initiating a telephone call to the telephone number according to the retrieved stored flow process based on the retrieved access number responsive to inputting of the second predetermined sequence.

According to another aspect of the present invention, an apparatus in a telephone for automatic execution of a telephone calling card call on a call by call basis using one of a plurality of carrier networks is provided. The apparatus comprises first user input means for inputting at least one data set, memory means for storing the at least one data set, second user input means for initiating each telephone call using a first predetermined sequence and for initiating each calling card call using a second predetermined sequence, the second predetermined sequence being different that the first predetermined sequence, means for determining a telephone number to be called, means for retrieving one of the at least one data set, and means for automatically initiating a telephone call to the telephone number according to the retrieved data set responsive to entering of the second predetermined sequence by the second user input means. According to another aspect of the present invention, a method used by a telephone for automatic execution of a telephone calling card call on a call by call basis using one of a plurality of carrier networks is provided. The method comprises the steps of inputting by the user of at least one data set, storing the at least one data set, detecting the initiation of each telephone call by recognizing a first predetermined sequence entered by the user and detecting the initiation of each calling card call by recognizing a second predetermined sequence entered by the user, the second predetermined sequence being different than the first predetermined sequence, determining a telephone number to be called, retrieving one of the at least one data sets in accordance with the detected second predetermined sequence, and automatically initiating a telephone call to the telephone number based on the retrieved data set responsive to entering of the second predetermined sequence by the user.

Still other objects, features and attendant advantages of the present invention will become apparent to those skilled in the art from a reading of the following detailed description of the embodiments constructed in accordance therewith, taken in conjunction with the accompanying drawings.

BRIEF DESCRIPTION OF THE DRAWINGS

The invention of the present application will now be described in more detail with reference to the preferred embodiments of the apparatus, given only by way of example, and with reference to the accompanying drawings, in which.

DETAILED DESCRIPTION

Figure 1A:
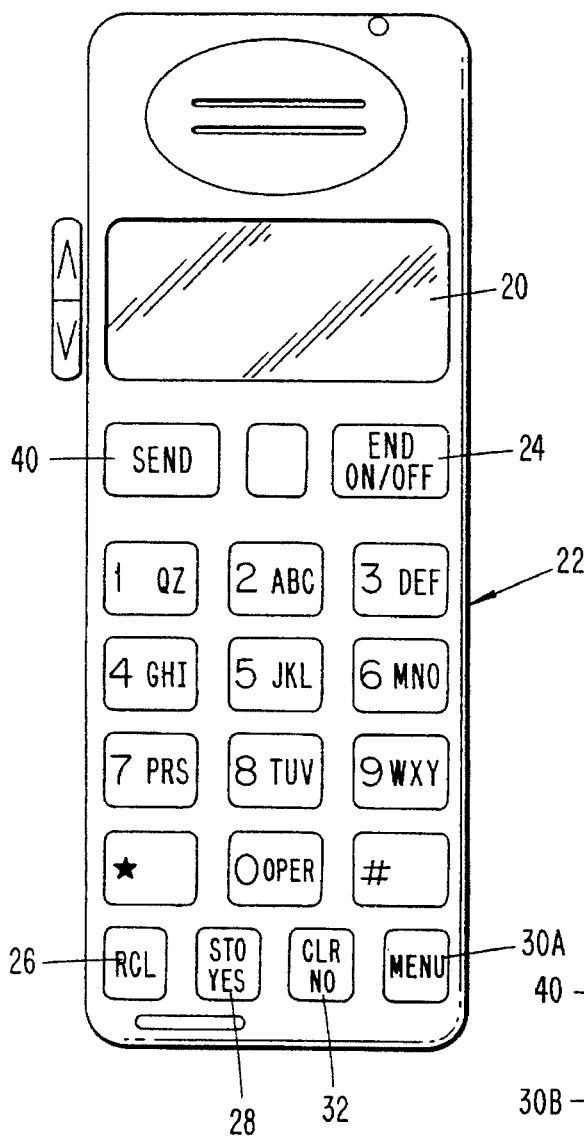
FIGS. 1A and 1B are general diagrams illustrating cellular telephones according to two embodiments of the present invention.

Use of a calling card account allows a subscriber to place a call through an independent carrier network via any local telephone exchange. By dialing a telephone number and providing an authorized user verification data stream, including a verification code and, if necessary, a personal identification number (PIN), the subscriber may, for example, place long distance calls through an independent carrier network. This is done most often to effect savings on long distance charges. The present invention provides a method and apparatus for storing a data set including at least the access number and the user verification data stream for one or more calling cards and executing the necessary process to make a connection through the carrier network. By originating a calling card call using a predetermined sequence which is different than the sequence used for non-calling card calls, telephone calls may be automatically or semi-automatically connected through the independent carrier network.

Many of the independent carrier networks such as, for example, AT&T™, U.S. Sprint™ and MCP™, each have a unique process for completing a call through their calling card accounts. One challenge confronted by the present invention is the ability to accommodate each of these processes with a common architecture that is also user friendly. The following discussion of these processes is meant to be illustrative only and not a limitation to those presented. For example, although the invention is described with respect to an implementation on cellular mobile telephones, it is considered that implementation on non-cellular telephones is contemplated within the scope of the invention. It is within the skill of the ordinary artisan to modify the description as necessary to implement the invention on non-cellular systems once in possession of the instant disclosure.

Further, although a description is made of the invention using a particular user interface, it is understood that other interfaces may be substituted therefor without departing from the intent and scope of the invention within the skill of the ordinary artisan once in possession of the present disclosure. Additionally, although the present invention is described in terms of storage, retrieval and use of calling card information, it is understood that other information may be stored, retrieved and used in accordance with the teachings of the present disclosure and within the scope of the present invention.

To place a call on a mobile telephone, the user usually enters the desired telephone number via the key pad, or recalls a previously programmed or dialed number. In either event, the desired number is stored in a dialed digit memory (DDM) and may be revealed on a display if the cellular telephone has a display. The present invention can be implemented on a telephone with or without a display, within the skill of the ordinary artisan in possession of the instant disclosure. The number stored in the DDM is the telephone number to which a connection is desired.

The user selects whether or not he/she wants to use a calling card by originating the call via different sequences. The sequences could be signaled by a number of techniques, including but not limited to depression of one or more keys on the key pad, voice activation, or menu selection. According to one embodiment, for example, the user presses the <SEND> key to originate a non-calling card call and presses the <MENU> or <FCN> key followed by one or more depressions of the <SEND> key to activate the automatic calling card sequence. Other embodiments involving voice activation of the different sequences, menu selection or the like are within the skill of the ordinary artisan once in possession of the present disclosure. It is understood that although the present disclosure refers to a particular set of keys and a particular user interface, it is for purposes of example only and the present invention may be implemented on any suitable telephone which has any set of keys and another user interface within the skill of the ordinary artisan once in possession of the present disclosure.

According to a first embodiment, the manufacturer pre-programs the telephone to include storage of a number of calling card processes to access the available carrier networks. The user may modify those processes as desired and stores in the telephone data sets including the access numbers and verification codes of only the carrier networks to which he subscribes. According to this embodiment, at least one set of storage locations, each set having, for example, four registers provided for storing the data sets including the access number and the verification data stream, the domestic flow process and the international flow process for one calling card.

According to a second embodiment, the user may enter a number of different calling cards for accessing carrier networks to which he subscribes by entering data sets including the access numbers, verification codes assigned by those carrier networks, and pause option commands. These entered data sets are stored in the telephone for later use. It is understood that separate flow processes as described with respect to the first embodiment are not required in the second embodiment because the pause and/or stop commands are input by the user along with or as part of the data sets. By including the pause and/or stop commands, the user is in effect entering the process required for access to the carrier network.

In particular, the user has available a menu option which allows the entering of one or more calling card data sets including access numbers, associated verification data streams and one or more pause commands. These entered access numbers and associated verification data streams are stored in sets or pairs of storage location, to be retrieved automatically when the user performs one of the predetermined sequences signalling a calling card call. The verification data streams may include a verification or card number or a verification or card number followed by a PIN, depending on the carrier network requirements. For example, while SPRINT requires only a verification or card number, AT&T requires both a verification or card number and a PIN to be entered before the call is completed.

According to this embodiment of the present invention, the data sets for each carrier network can be stored in a set or pair of storage or memory locations, for example, the access number can be stored in a first location and the associated verification stream can be stored in the second location of the pair. There would thus be a plurality of pairs of storage locations, each pair would store a data set assigned by a carrier network. Each pair of storage locations could be accessed to make a calling card using the data set stored therein by entering a different predetermined sequence. The pause commands can be entered as part of either or both of the storage locations in the pair.

In both embodiments, when the telephone detects that one of the predetermined sequences signalling a calling card call has been used, it determines which of the storage locations to access by examining the predetermined sequence. For example, the depression of the <MENU> key followed by a single <SEND> key may signal that the first stored calling card access number, verification data stream, and in the case of the first embodiment, which process, is to be used, while the depression of the <MENU> key followed by the <SEND> key twice in succession may signal that the second stored calling card access number, verification data stream, and in the case of the first embodiment, which process, is to be used. The telephone selects and uses the appropriate card access number, verification data stream, and in the case of the first embodiment, the appropriate process, based on this examination.

Figure 1B:
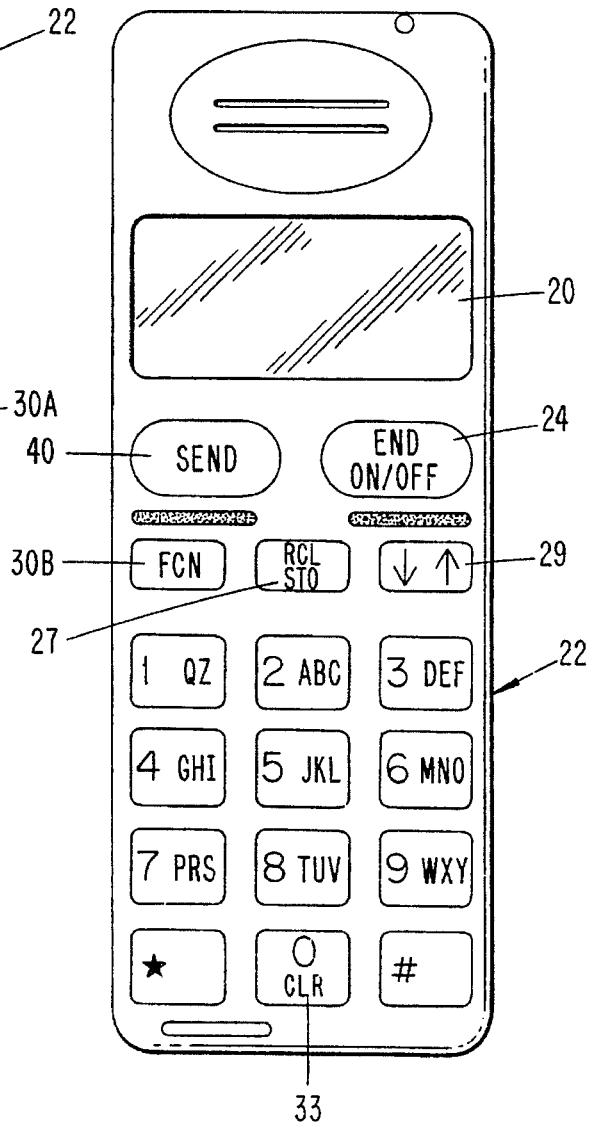

FIGS. 1A and 1B illustrate the telephone according to the two described embodiments of the present invention. The exemplary telephone in FIG. 1A includes a display 20, a <MENU> key 30A, and a <SEND> key 40. The telephone also includes a ten-key pad 22, an <END> (or <ON/OFF>)key 24, a <RCL> key 26, a <STO> (or <YES>) key 28, and a <CLR> (or <NO>) key 32. Other features of the telephone are standard and are not described herein. In the embodiment illustrated in FIG. 1B, like elements are referenced with the same reference numerals and will not be described herein. The telephone includes a <FCN> key 30B corresponding to the <MENU> key 30A, a combined <RCL/STO> key 27, an arrow key 29 for scrolling between lines in the display 20, and a <CLR> key 33 which is also the numeral "0" key. Although the present description is presented in terms of the keys and layout shown in FIGS. 1A and 1B for ease of understanding, it is within the skill of the ordinary artisan to substitute other keys and/or another layout to perform the tasks discussed herein once in possession of the present disclosure. For example, instead of a <MENU> or <FCN> key, a <F> key could be used. In addition, voice commands can be used to instruct the telephone in place of the use of the key pad. Further modifications are within the skill of the ordinary artisan once in possession of the present disclosure.

There are a number of different processes used by the different carrier networks to allow subscribers to gain access to the networks. Table 1 illustrates five processes used by some of the available carrier networks to establish a telephone connection. These processes are illustrated here for purposes of example only and the invention is not limited to these five processes. The access number, telephone number, user verification code and user PIN code given are examples for illustrative purposes only. As new procedures are implemented by the calling card companies, modifications can be made by an ordinarily skilled artisan in possession of the present disclosure.

Referring to Table 1, Process number 1 (used for example by the GE Dialcomm telephone network) involves dialing the access number, waiting for a prompt indicating the next step should be started, dialing the destination telephone number, waiting for a prompt, and transmitting the verification code. The connection is then completed. Process 2 (used for example, by the AT&T telephone network) involves dialing the access number followed by a zero ("0") and the telephone number appended directly thereto, waiting for a prompt, and transmitting the verification code followed by PIN code. The connection is then completed. Process number 3 (used for example by the SPRINT telephone network) involves dialing the access number, waiting for a prompt indicating the next step should be started, dialing the telephone number with a "0" prefix, waiting for a prompt, and transmitting the verification code. The connection is then completed. Process number 4 (also used for example, by the SPRINT telephone network) involves dialing the access number followed by a "0" and the telephone number, waiting for a prompt, and transmitting the verification code. The connection is then completed. Process number 5 (used for example by the MCI telephone network) involves dialing the access number, waiting for a prompt, transmitting the verification code, waiting for a prompt, and dialing the telephone number to be called. The connection is then completed.

Figure 2:
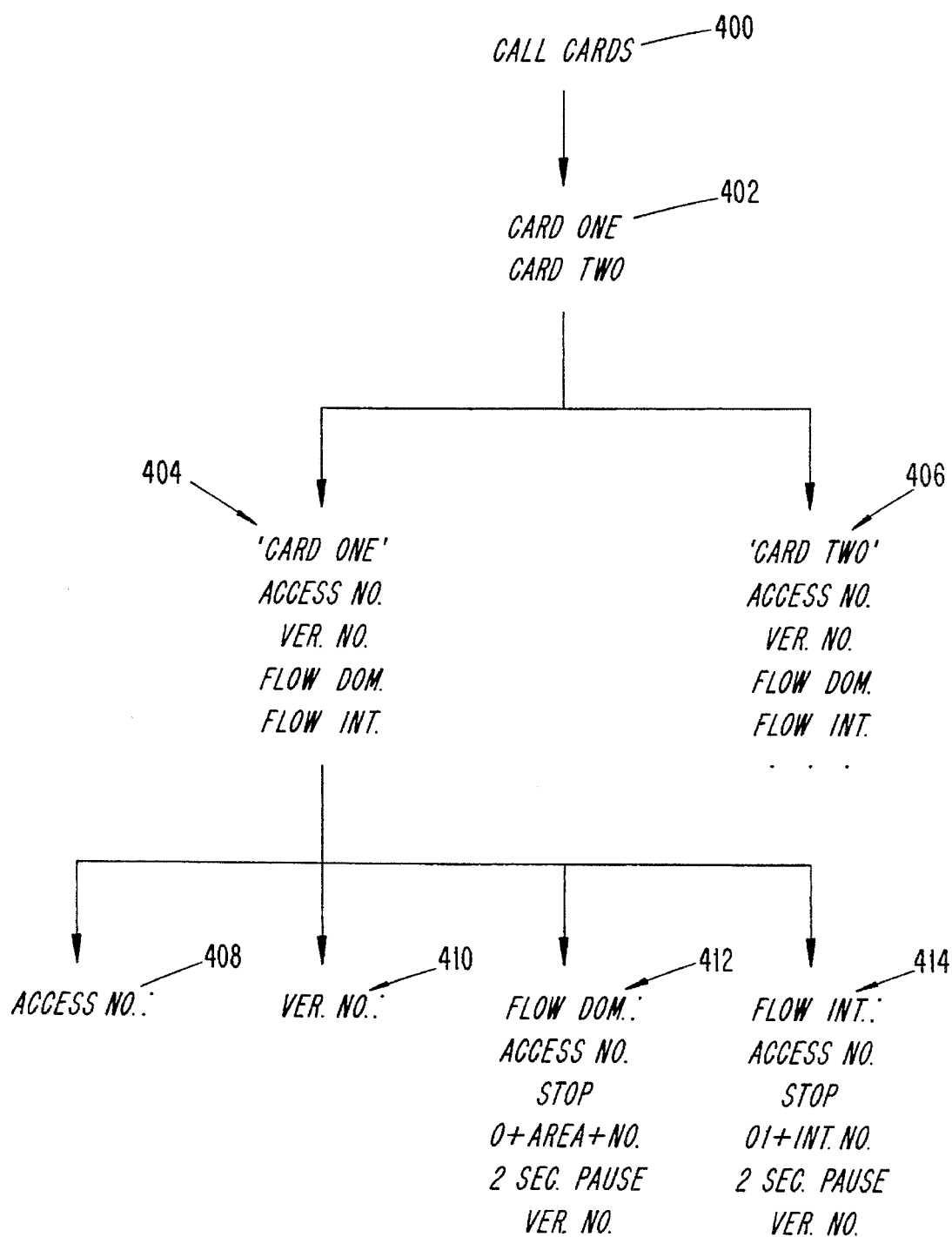
FIG. 2 is a flow diagram of a menu system according to one embodiment of the present invention.

FIG. 2 illustrates the menu sequence that a user would use to enter the data set including the access number and verification data stream and modify the default flow process associated with the entered access number according to the first embodiment of the present invention. For purposes of this description, a display menu system is described. It is within the skill of the ordinary artisan to implement this menu system using other techniques or other flows, such as for example, voice menus, once in possession of the present disclosure. Menu 400 is the calling card selection of a main menu consisting of, for example, nine selections. According to one embodiment, these selections (not shown) are sounds, general setup, call setup, call data, system options, services, locks, call cards and memory. The menus, other than the call cards memory, are not relevant to the present invention and so are not discussed herein.

When the user selects the "CallCard" selection, menu 402 is displayed. Menu 402 shows options for two cards: "Card One" and "Card Two". The user selects one of these choices to get to menus 404 or 406. These two menus as well as the menus branching from menus 404 and 406 are the same for both cards; therefore, only the menu 404 will be described herein. It is understood that the flow process may be different for branch 404 and 406, depending upon the flow appropriate for the carrier network associated with the stored access numbers.

Menu 404 has four options: "Access no.", "Ver. no.", "Flow dom.", and "Flow int.". For each card stored in memory, the access number, verification number, domestic flow and international flow can be stored in registers 1, 2, 3 and 4, (FIG. 4A) respectively. The "Access no." choice allows the user to enter the access number for card one using menu 408. According to one embodiment, the access number of the card is entered on the second line, right-oriented, and 32 digits can be entered, but only the last 12 are shown. The "Ver. no." choice allows the user to enter the verification data stream, that is, the verification code, and if necessary, the PIN code, for card one using menu 410. According to one embodiment, the verification code and/or PIN code of the card is entered on the second line, right-oriented, and 32 digits can be entered, but only the last 16 digits are shown. The (four) most right positions on the top line are used for numbers longer than 12 digits.

According to the first embodiment of the present invention, the entry of an access number causes the telephone to select a default flow process to be assigned for that card number. In other words, the telephone is preprogrammed by the manufacturer with a number of flow processes that are required for access to the available carrier networks. These flow processes are stored in a memory in the telephone. For example, when the user enters an access number for SPRINT, the telephone looks up in the memory to determine the process the SPRINT carrier network expects to see when the entered access number is used. The telephone then assigns that flow process which is associated with the entered access number as a default flow process for that card. Five possibilities for these stored flow processes correspond to the process shown in Table 1 which are used to access some of the available carrier networks.

The "Flow dom." (domestic flow) and "Flow int." (international flow) choices, through menus 412 and 414, respectively, allow the user to modify the default flow or process associated with the entered access number. Therefore, for example, if the default process requires that the user hit a key to activate each successive number before it is transmitted (i.e., between the access number and the dialed number), the user can change this process to one in which there is a 2 or 5 second timeout, which causes the next number to be transmitted without action on the part of the user.

As noted above, the process for dialing and transmitting the calling card parameters and destination number varies between calling cards. Menus 412 and 414 allow the users to modify the default processes for their cards. The process are split up into five different sections or parameters. The scroll keys move between the sections. All sections except for the first have multiple options, that can be toggled using the digit keys, for example.

The first parameter is always the access number. Both the second and fourth parameters are selected from the set of {Stop, Continue, 2 sec pause, 5 sec pause, 10 sec pause}. The pause options here determine whether or not there is a pause after the preceding parameter. Stop requires the user to manually activate the next step by pressing a key (or some other method) to send the next parameter. Continue results in the next parameter being sent immediately after the preceding parameter. The other pause options cause time delays.

In the domestic flow or process, both the third and fifth parameter are selected from the set of {area+no, 0+area+no, 1+area+no, Ver. no}. The first three options result in the destination number being used in this section of the flow (third or fifth). If this number is 10 or 11 digits (with or without the automatic area code and automatic prefix being added), the number is modified (if necessary) to match the selected option before being sent. For example, if 0+area+no is active, the destination number 13125551212 is changed to 03125551212 before being sent by stripping the "1" and appending the "0". Ver. no causes the verification (and/or PIN) code to be used in this section of the flow.

The international flow or process set for the third and fifth parameters is {01+int. no, 011+int. no, Ver. no}. The first two options result in the destination number being used in this section of the flow. If this number is 12 digits or longer and starts with "01" or "011", the number is modified (if necessary) to match the selected option before being sent.

According to one embodiment, the settings of the access numbers listed in Table 2 cause the default values shown to be set for the processes. The default values of parameters 2–5 are shown for both the domestic and the international flow. These default values can be modified by the user, for example, by scrolling through the plurality of means.

The first time the third parameters of the flows are changed after a new setting of the access number, it affects the fifth parameters which are automatically changed as necessary. In particular, changing the third parameter to area+no, 0+area+no, 1+area+no or 01+int. no, 011+int. no, changes the fifth parameter to Ver. no. Changing the third parameter to Ver. no changes the fifth parameter to area+no and 011+int. no. The first time the third and fifth parameters of the domestic flow are changed after a new setting of the access number, the corresponding parameters in the international flow are also changed. In particular, if the third or fifth parameter in the domestic flow is changed to area+no, 1+area+no, the corresponding parameter in the international flow is automatically changed to 011+int. no. If the third or fifth parameter in the domestic flow is changed to 0+area+no, the corresponding parameter in the international flow is automatically changed to 01+int. no. If the third or fifth parameter in the domestic flow is changed to Ver. no, the corresponding parameter in the international flow is automatically changed to Ver. no.

According to the second embodiment of the present invention, processes may be programmed by the user for up to two chosen calling cards by storing access numbers, verification data streams and appropriate pauses or stops in memory locations for each card. Where the codes and/or pauses are stored is determined by the process required to gain access to the calling cards chosen by the user. Five possibilities for these stored processes are shown in Table 3 as exemplary processes only. These examples correspond to the process numbers 1 through 5 shown in Table 1. In one exemplary embodiment these memory locations are *6 and *7 for the first calling card and *8 and *9 for the second calling card. Using other memory locations is within the skill of the ordinary artisan once in possession of the present disclosure. For purposes of this description, locations *6 and *8 correspond to registers 1A and 1B (FIG. 4B), respectively, and *7 and *9 correspond to registers 2A and 2B, respectively. In particular, the user enters information into the registers 1A, 1B, 2A and 2B, by pressing *6, *8, *7, and *9, respectively.

As shown in Table 3, for a process that requires a pause or fixed stop after connecting to the carrier network, the user may append the letter "P" for pause or "F" for fixed stop, to the access number to be stored in register 1. Register 2 would then contain a "P" or "F" followed by the verification data stream consisting of the verification code. This is shown in examples 1 and 3. In this embodiment, selection of a pause causes a time delay, for example of 2 seconds. Selection of a fixed stop causes a delay until, as a convenience to the user, any key is pressed to continue operation.

For a process that requires a five digit access code as a prefix to the destination number, register 1 is empty and the five digit access code is stored in the DDM. Register 2 would again contain a "P" or "F" followed by the verification data stream (see examples 2 and 4). In example 2, the verification data stream includes a verification code and a PIN number, while in example 4, only the verification code is required. Register 2 would be empty for a process that requires the access number, followed by a pause or stop, followed by the verification data stream consisting of the verification code, followed by a pause or stop, followed by the DDM number (see example 5).

Table 4 illustrates examples of the programming required by the user and the results of that programming according to the second embodiment of the present invention.

According to the second embodiment, automatic stripping and appending of leading "0"s and "1"s are available to account for different requirements by the carrier networks. For example, if a user has stored his long distance numbers in the normal memory with a preceding "1", e.g., 1805551212, and his calling card requires a "0" instead, this is handled as follows. At the end of location *6, the "1" is removed and the "0" is added, e.g., 18005551212P-10. The minus sign removes the succeeding digit and the zero is added. If a 10 digit number without any preceding digits is required for the calling card usage it would instead be 18005551212P-1 (without the last zero). If long distance numbers are stored in the normal memory with the initial digits "011", e.g., "01146461810000" and the calling card requires "01" before the number, e.g., "014646181000", this is accomplished as follows. "18005551212P-0-1-101", "011" is stripped off and "01" is added.

According to an alternative embodiment, a leading "1" would be stripped from all eleven digit numbers starting with a "1". An option could be included in a menu mode that would determine whether or not leading "1"s would be stripped.

According to both the first and second embodiments of the present invention, to initiate a calling card sequence, the user presses first the menu or function key (<MENU> 30A or <FCN> 30B) followed by the SEND key (<SEND> 40) or the menu or function key followed by two successive depressions of the SEND key. Thus, the user signifies that he/she wishes to make a calling card call by using one of a number of predetermined sequences recognized by the system as signifying a calling card call using one of the data sets stored in one of the locations in memory. Pressing only the send key (<SEND> 40) will cause the telephone to follow the normal call procedure. In this way, each call is separately identified by the system to be a calling card call or a call for which normal billing procedures are to be used.

Figure 3A:
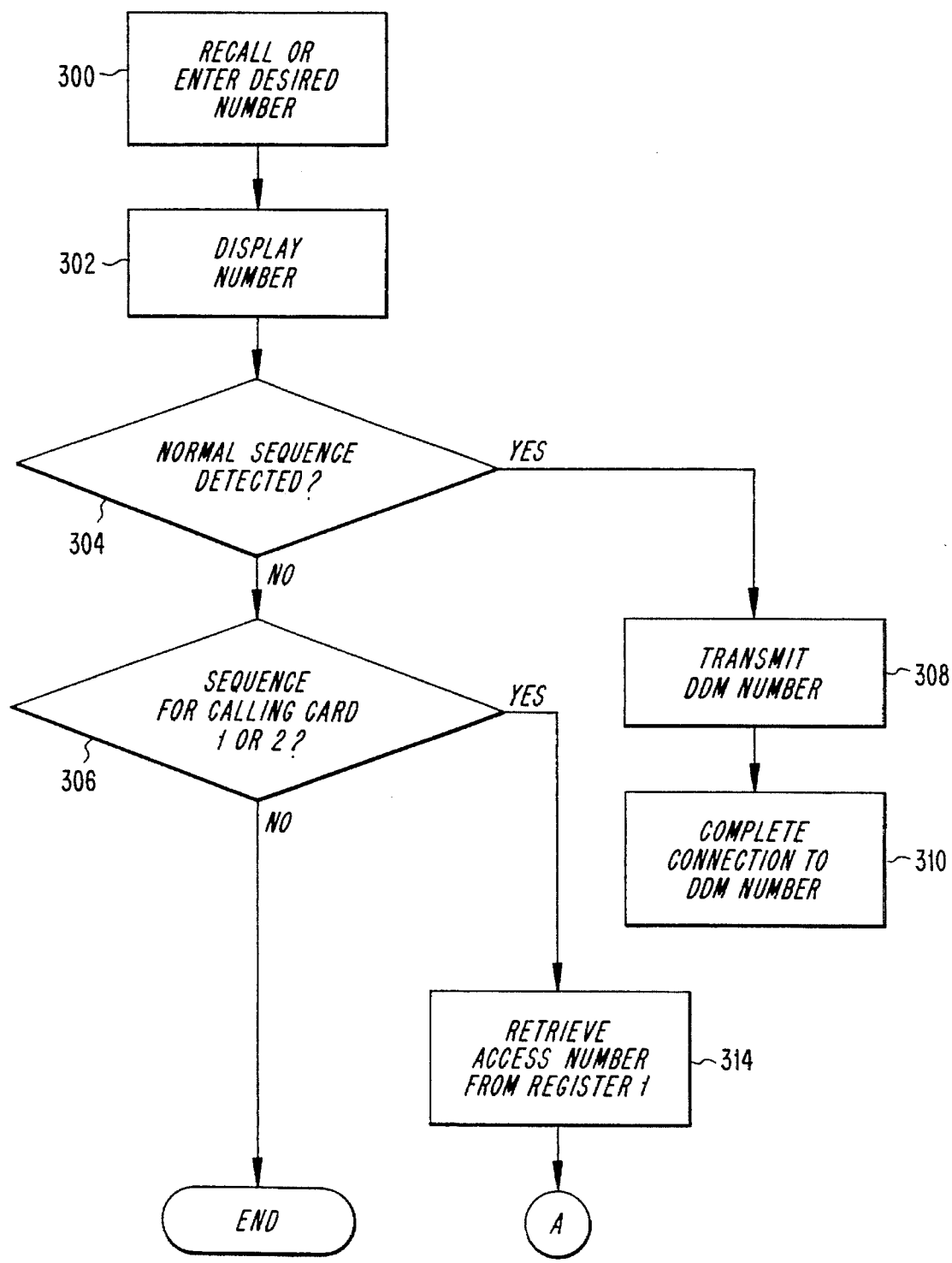
FIGS. 3A and 3B are flow charts illustrating one embodiment of the present invention.
Figure 3B:
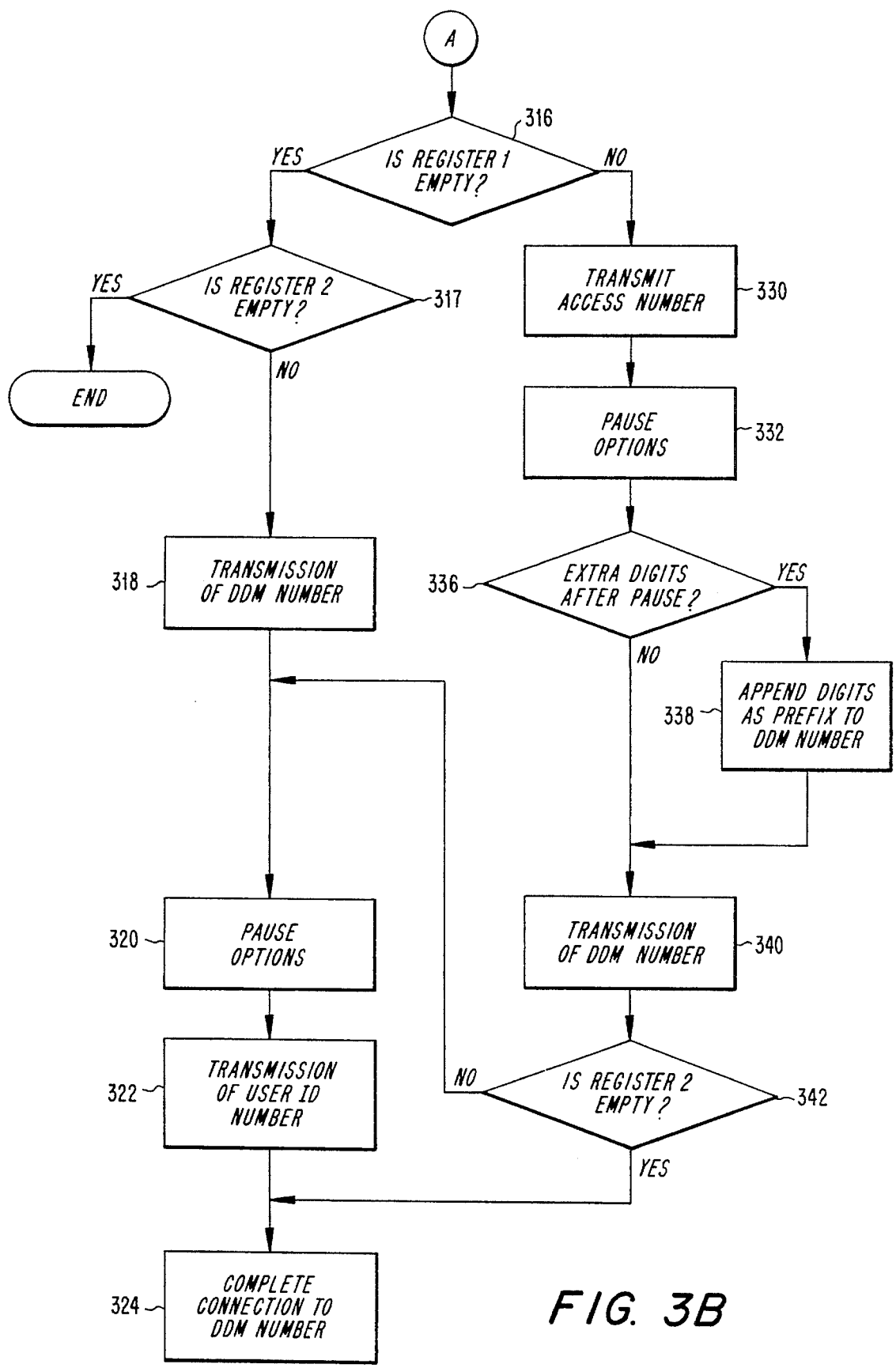

FIGS. 3A and 3B are flow charts illustrating the second embodiment of the present invention. The detailed programming of an implementation of the invention is within the skill of the ordinary artisan in possession of the instant disclosure. As shown in FIG. 3A, the telephone number which is to be called is either recalled from memory or entered by the user (step 300). This number is stored in the DDM. Additionally, if the telephone includes a display, this number is displayed at step 302.

At step 304, a determination is made whether the user has performed the normal call initiation sequence for indicating making a non-credit card call. According to one embodiment, this sequence is the depression of the <SEND> key. If this sequence is detected, i.e., the <SEND> has been pressed, the number stored in the DDM is transmitted at step 308 and the connection is completed to the DDM number at step 310.

If the normal sequence is not detected, a determination is made whether one of the sequences for placing a calling card call has been performed at step 306. In one embodiment, the user initiates the automatic calling card sequence by pressing the <FCN> <SEND> keys successively to use the first stored calling card and by pressing the <FCN> <SEND> <SEND> keys successively to use the second stored calling card. In this way, the user inputs a first predetermined sequence for initiating each telephone call and a second predetermined sequence for initiating each calling card call, the second predetermined sequence being different that the first predetermined sequence.

According to one embodiment, if no number is entered or recalled specifically by the user, but the user wants to make a non-calling card call (step 304) or a calling card call (step 306) and indicates this by performing one of the predetermined sequences, the telephone assumes that the user wants to dial the last dialed number and places the last dialed number in the DDM (not shown). Using an alternative procedure, the user can select for dialing one of a number of last dialed numbers, for example, by pressing <RCL>, <RCL>, a scroll key, <FCN>, <SEND>. The telephone then places the selected number in the DDM.

If one of the predetermined sequences is not detected at step 306, the routine ends. If one of the predetermined sequences is detected, the access number is retrieved from register 1A or 1B (registers 504 in FIG. 4) at step 314. Which register 504 and corresponding register 506 are accessed depends upon which predetermined sequence was detected. That is, registers 1A and 2A are accessed in response to detection of a first of the predetermined sequences (e.g., <FCN> <SEND>)and registers 1B and 2B are accessed in response to detection of a second of the predetermined sequences(e.g., <FCN> <SEND> <SEND>).

Referring to FIG. 3B, if the register 504 accessed by the detected sequence is empty at step 316, that means that no access number has been previously stored. Next, a determination is made whether the corresponding register 506 (register 2A or 2B) is empty (step 317). If so the routine ends, with no call being placed. If the register 506 is not empty, the DDM number, including the five digit number is transmitted at step 318. A pause options state is entered at step 320.

In the pause options state according to one embodiment of the present invention, there are three alternatives: the next number is transmitted automatically without a pause; the next number is transmitted automatically after a temporary pause (for example, a 2 second timeout then continue); and the next number is transmitted after manual activation (for example, timeout until the user presses any key). The pause option state is followed by the transmission of the user verification data stream at step 322. In process 2, the data stream includes the verification code and the PIN code. In process 4, the data stream includes just the verification code. The call is then completed at step 324.

If the register 504 (register 1A or 1B) is not empty at step 316, the access number is transmitted at step 330. The pause options state is executed at step 332. At step 336, if further digits are present after the pause in register 1, step 338 is executed to append these extra digits as a prefix to the DDM number. If there are no extra digits after the pause, and after step 338, the DDM number is transmitted at step 340. At step 342, a determination is made as to whether register 2 is empty. If so, then step 324 is executed to complete the connection to the DDM number. If register 2 is not empty, steps 320, 322, and 324 are executed.

In the cases described in connection with this embodiment of the present invention, as shown in Table 3, the second register number 506, if it is not empty, contains the user verification data stream. In one case (process 2 for the AT&T network) the verification data stream includes a PIN code. No prefix or suffix is usually appended to the verification code. However, a pause may be prefix to the verification code if necessary. According to current usages a verification code may be up to 14 digits long and a PIN code may be up to 4 digits long.

Figure 4A:
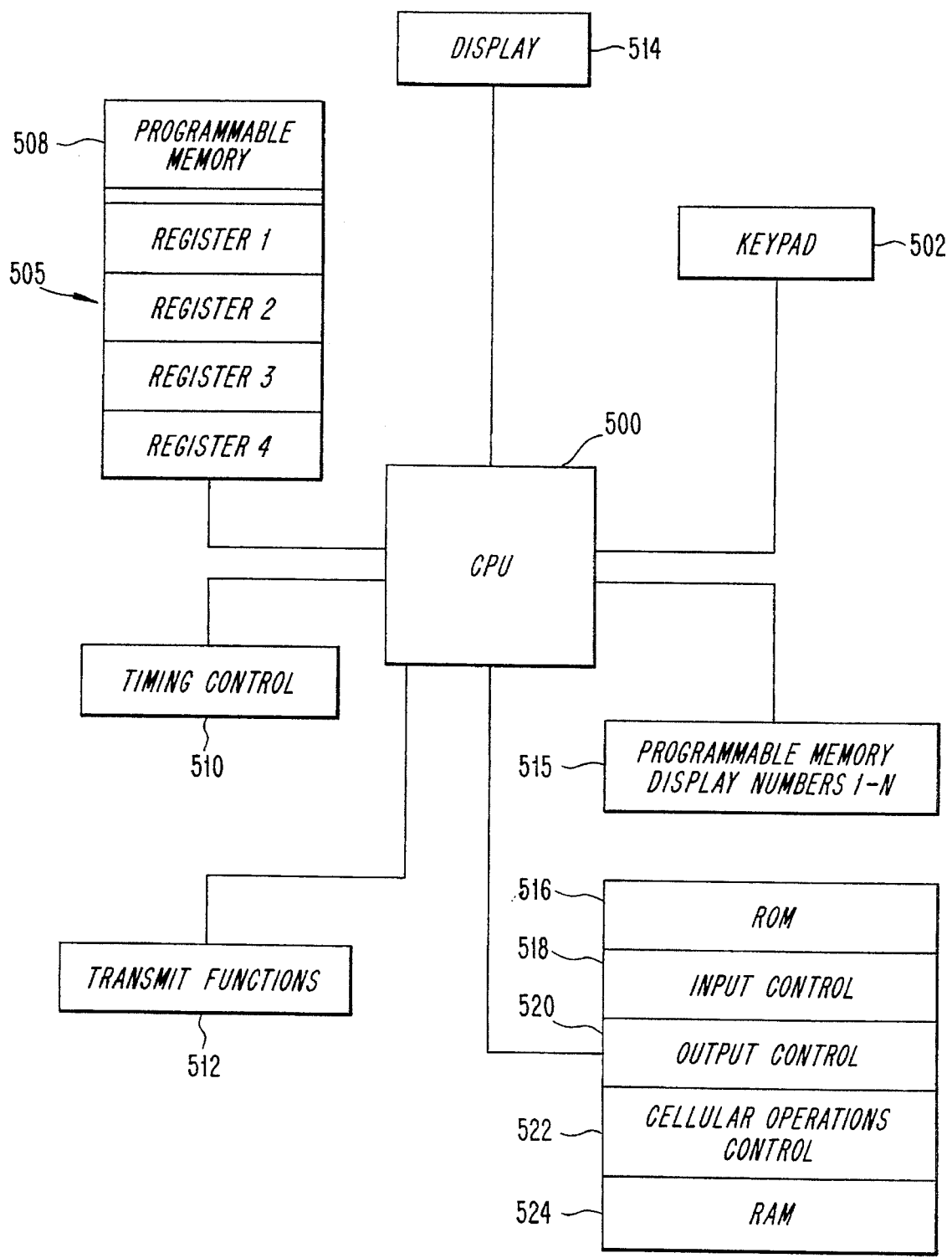
FIGS. 4A and 4B illustrate functional block diagrams of two exemplary embodiments of the hardware used to implement the present invention.
Figure 4B:
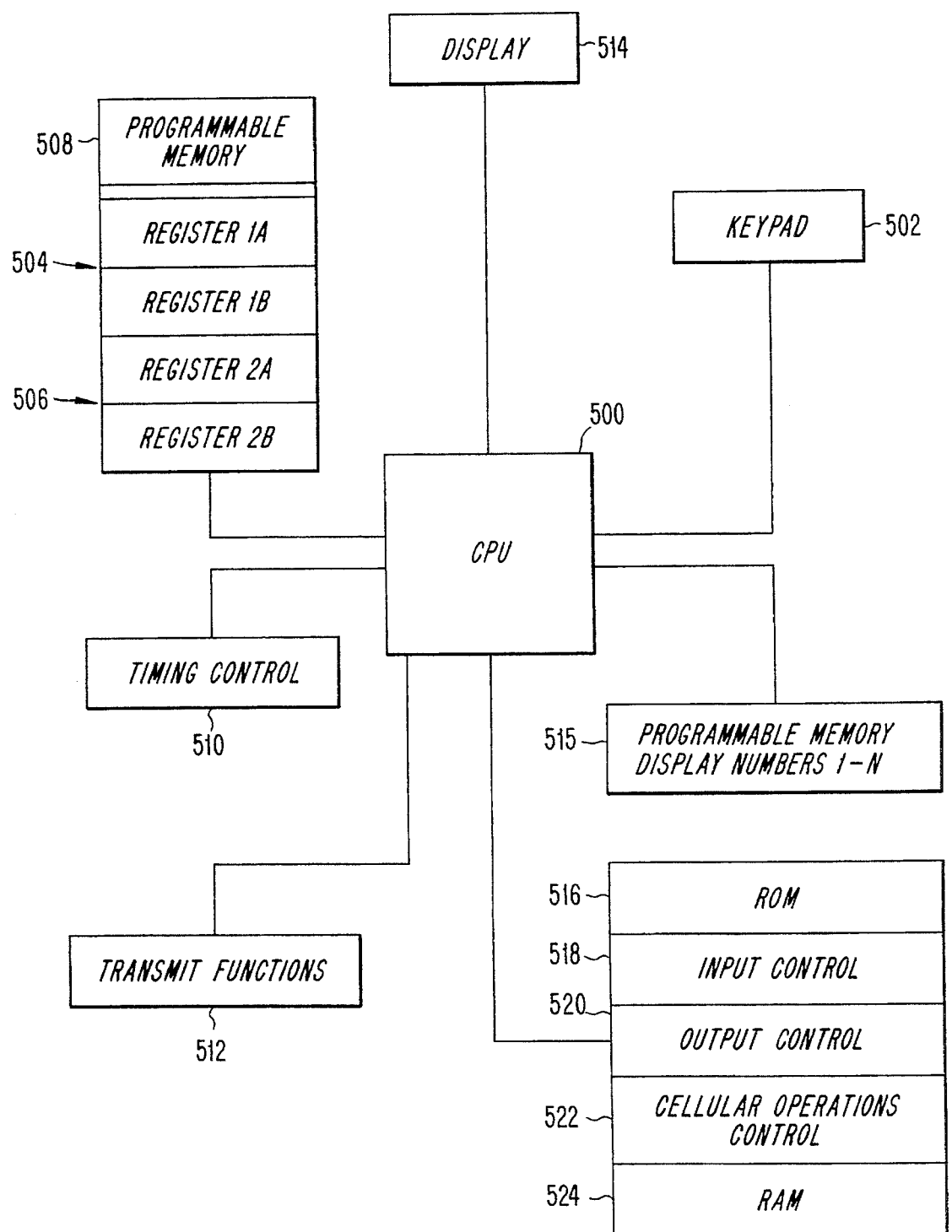

FIGS. 4A and 4B illustrate functional block diagrams of two exemplary embodiments of the hardware used to implement the present invention. The embodiment shown in FIG. 4A can be used to implement the first embodiment described above with respect to FIG. 3 and the embodiment shown in FIG. 4B can be used to implement the second embodiment described above with respect to FIG. 2.

In the first embodiment shown in FIG. 4A, a central processing unit (CPU) 500 may be an independent logic chip or representative of a function provided within a larger circuit. User interface to the CPU 500 and memory is accomplished with a keypad 502. Calling card registers 1A, 1B (504) and 2A, 2B (506) are memory locations separate from the general programmable memory 508 used for all other telephone functions. Each register is accessible via the CPU 500 and keypad 502. The timing control 510 provides for an interrupt whenever a pause is encountered. A paused operation may be continued via the keypad or it may timeout after a period of time as described above. The transmit functions 512 are specific to the channel interface requirements (e.g., AMPS, GSM, IS-54). Programmable memory 515 for display numbers 1 through n is also provided in which n telephone numbers may be stored. These stored numbers are used for operations such as call logs, speed dialing, last numbers dialed, etc. Also connected to the CPU 500 is a read only memory (ROM) 516, input control 518, output control 520, cellular operations control 522 and random access memory (RAM) 524. The ROM 518 stores the telephone's operating instructions, and the input and output control 518, 520 are keypad interface/scan. The cellular operations control 522 is a microprocessor that acts as a command device for coordinating the overall operation and the RAM 524 is a volatile memory device used primarily as a scratchpad, for example, as the dialed digit memory.

Although two pairs of registers 1A, 1B and 2A, 2B are shown in FIG. 4A, it is understood that alternative embodiments may include as many registers as desired, each pair of registers storing the access number and verification number according to the teachings of the present disclosure. The provision of such additional registers is within the skill of the ordinary artisan once in possession of the present disclosure.

The second embodiment illustrated in FIG. 4B includes substantially the same elements as shown in FIG. 4A. The elements common to both are referenced with the same numerals and will not be described herein. FIG. 4B includes a plurality of registers 505 (registers 1, 2, 3 and 4) instead of pairs of registers of FIG. 4A. According to this embodiment, the access number is stored in register 1, the verification number of stream in register 2, the domestic flow in register 3 and the international flow in register 4. In a preferred embodiment there are a second set of registers 5, 6, 7 and 8 (not shown) for storing the information needed for the second calling card.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology of terminology employed herein is for the purpose of description and not of limitation.

TABLE 2

| Length 5 digits: | [Continue, 0 + area + no/01 + int.no, 2 sec pause, Ver. no] |
|---|---|
| 18006747000: | [Stop, Ver. no. 2 sec pause, Area + no/011 + int.no] |
| 18003477843: | [Stop, Area + no/011 + int.no, 2 sec pause, Ver. no] |
| Other: | [Stop, 0 + area + no/01 + int.no, 2 sec pause, Ver. no] |

TABLE 3

|  | 1 | 2 | 3 | 4 | 5 |
|---|---|---|---|---|---|
| Register 1 | 18001234567 | 102880 | 18001234567P | 103330 | 18001234567P12345678911234P |
| DDM Number | 13125551212 | 3125551212 | 13125551212 | 3125551212 | 131255551212 |
| Register 2 | P12345678911234 | P123456789112345555 | P12345678911234 | P12345678911234 |  |

TABLE 1

Access number: 800 123 4567
Telephone number: 312 555 1212
User verification code: 12345678911234
User PIN code: 5555

Process Number 1 (GE DIALCOMM)

Dial Access number (e.g., 180012334567)
Wait for prompt or manual activation
Dial Telephone number
(e.g., 13125551212)
Wait for prompt or manual activation
Enter User verification code
(e.g., 12345678911234)
Connection is completed
Process Number 2 (AT&T)

Dial Access number with telephone
number appended
(e.g., 1028803125551212)
Wait for prompt or manual activation
Enter User verification and PIN codes
(e.g., 123456789112345555)
Connection is completed
Process Number 3 (SPRINT)

Dial Access number (e.g., 180012334567)
Wait for prompt or manual activation
Dial Telephone number with prefix
(e.g., 03125551212)
Wait for prompt or manual activation
Enter User verification code
(e.g., 12345678911234)
Connection is completed
Process Number 4 (SPRINT)

Dial Access number with prefix
(e.g., 1033303125551212)
Wait for prompt or manual activation
Enter User verification code
(e.g., 12345678911234)
Connection is completed
Process Number 5 (MCI)

Dial Access number (e.g., 180012334567)
Wait for prompt or manual activation
Enter User verification code
(e.g., 12345678911234)
Wait for prompt or manual activation
Dial Telephone number
(e.g., 13125551212)
Connection is completed

TABLE 4

1) Location *6 contains a number without any pauses, the number in location *7 starts with a pause: <MENU><SEND> sends the number in *6 with the number in the DDM appended; "Any key continue" sends the number in location *7.
2) Location *6 contains a number ending with a pause, the number in location *7 starts with a pause: <MENU><SEND> sends only the number in *6 (not including the pause); "Any key continue" the first time sends the number in the DDM; "Any key Continue" the second time sends the number in location *7.
3) Location *6 contains a number ending with a pause, but ending with a digit, the number in location *7 starts with a pause: <MENU><SEND> sends the number in *6 until but not including the pause; "Any key continue" the first time sends the number in *6 after the pause with the number in the DDM appended; "Any key continue" the second time sends the number in location *7.
4) Location *6 contains 2 numbers separated with a pause, another pause is at the end of the second number, location *7 is empty: <MENU><SEND> sends the number in *6 until but not including the pause; "Any key continue" sends the number in *6 until but not including the second pause; "Any key continue" the second time sends the number in the DDM.
5) Location *6 is empty, the number in location *7 starts with a pause: <MENU><SEND> sends the number in the DDM; "Any key continue" sends the number in location *7.
6) Any of the above cases, but no pause in the beginning of location *7. The number in location *7 (up to but not including a possible pause), will be appended to and sent with the number in the DDM. If one or more parts of the number in location *7 are preceded by a pause, these are sent by "any key continue".

What is claimed is:

1. An apparatus for automatic execution of a telephone calling card call on a call by call basis using one of a plurality of carrier networks, the apparatus comprising:

memory means for storing a plurality of data sets in accordance with requirements for use of the carrier networks;

user input means for initiating each telephone call using a first predetermined sequence and for alternately initiating each calling card call using a second predetermined sequence, the second predetermined sequence being different than the first predetermined sequence;

means for retrieving one of the stored data sets responsive to the second predetermined sequence; and means for automatically initiating a telephone call in accordance with the retrieved stored data set responsive to entering of the second predetermined sequence by the user input means.

2. The apparatus of claim 1, wherein said memory means comprises at least one set of storage locations, each set of storage locations storing one of said plurality of data sets, and wherein the second predetermined sequence is different for each set of storage locations and said retrieving means retrieves said one of the stored data sets from one of said sets of storage locations dependent upon which of said second predetermined sequences is input.

3. The apparatus of claim 1, further comprising means for storing and modifying a plurality of flow processes to be performed in accordance with the requirements for use of the carrier networks, at least one of the flow processes being associated with each one of the stored data sets, wherein the means for automatically initiating initiates a call according to the at least one flow process associated with the retrieved data set.

4. A method of placing a calling account card telephone call on a call by call basis using one of a plurality of carrier networks, the method comprising the steps of:

storing a plurality of data sets in accordance with requirements for use of the carrier networks;

detecting the initiation of each telephone call by recognizing a first predetermined sequence input by the user and alternately detecting the initiation of each calling card call by recognizing a second predetermined sequence input by the user, the second predetermined sequence being different than the first predetermined sequence;

retrieving one of the stored data sets responsive to the detected second predetermined sequence; and automatically initiating a telephone call in accordance with the retrieved stored data sets responsive to inputting of the second predetermined sequence.

5. The method of claim 4, wherein the second predetermined sequence is different for each of a plurality of sets of storage locations for storing one of said plurality of data sets.

6. The method of claim 4, further comprising storing and allowing user modification of a plurality of flow processes to be performed in accordance with the requirements for use of the carrier networks, at least one of the flow processes being associated with each one of the stored data sets, wherein the step of automatically initiating initiates a call according to the at least one flow process associated with the retrieved data set.

7. An apparatus for automatic execution of a telephone calling card call on a call by call basis using one of a plurality of carrier networks, the apparatus comprising:

memory means for storing at least one access number, the at least one verification data stream and at least one flow process to be performed in accordance with requirements for use of the carrier networks;

first user input means for inputting the at least one access number and the at least one verification data stream to be stored in said memory means, and for modifying the at least one flow process;

second user input means for initiating each telephone call using a first predetermined sequence and for alternately initiating each calling card call using a second predetermined sequence, the second predetermined sequence being different than the first predetermined sequence;

means for determining a telephone number to be called;

means for retrieving one of at least one access numbers, one of the verification data streams, and one of the stored flow processes responsive to the second predetermined sequence; and means for automatically initiating a telephone call to the telephone number according to the retrieved stored flow process responsive to entering of the second predetermined sequence by the second user input means.

8. The apparatus of claim 7, wherein said memory means comprises at least two sets of storage locations, each set of storage locations storing at least an access number, a verification data stream and a flow process and wherein the second predetermined sequence is different for each set of storage locations.

9. The apparatus of claim 7, further comprising a display means for displaying the telephone number to be called.

10. A method of placing a calling account card telephone call on a call by call basis using one of a plurality of carrier networks, the method comprising the steps of:

storing at least one flow process to be performed in accordance with requirements for use of the carrier networks;

inputting, via user input means, at least one access number and at least one verification data stream;

providing a menu option to allow a user to modify the at least one flow process;

storing the at least one access number and the at least one verification data stream input by the user input means;

detecting the initiation of each telephone call by recognizing a first predetermined sequence input by the user and alternately detecting the initiation of each calling card call by recognizing a second predetermined sequence input by the user, the second predetermined sequence being different than the first predetermined sequence;

determining a telephone number to be called;

retrieving one of at least one access numbers, one of the verification data streams, and one of the stored flow processes responsive to the detected second predetermined sequence; and automatically initiating a telephone call to the telephone number according to the retrieved stored flow process based on the retrieved access number responsive to inputting of the second predetermined sequence.

11. The method of claim 10, wherein the at least one access number, the at least one verification number, and the at least one flow process are stored in a set of storage locations the second predetermined sequence is different for each set of storage locations.

12. The method of claim 10, further comprising the step of displaying the telephone number to be called.

13. An apparatus in a telephone for automatic execution of a telephone calling card call on a call by call basis using one of a plurality of carrier networks, the apparatus comprising:

first user input means for inputting at least one data set;

memory means for storing the at least one data set;

second user input means for initiating each telephone call using a first predetermined sequence and for alternately initiating each calling card call using a second predetermined sequence, the second predetermined sequence being different that the first predetermined sequence;

means for determining a telephone number to be called;

means for retrieving one of the at least one data set; and means for automatically initiating a telephone call to the telephone number according to the retrieved data set responsive to entering of the second predetermined sequence by the second user input means.

14. The apparatus of claim 13, wherein said second memory means comprises at least two pairs of storage locations, each pair of storage locations storing a data set, and wherein the second predetermined sequence is different for each pair of storage locations.

15. The apparatus of claim 13, wherein said at least one data set includes an access number, a verification data stream and at least one pause option command.

16. The apparatus of claim 13, wherein the means for determining a telephone number comprises:

user input means for entering the telephone number to be called;

a dialed digit memory for storing the entered telephone number;

a last dialed number memory for storing at least one telephone number which previously had been dialed; and wherein the means for determining a telephone number determines that the telephone number to be called is a previously dialed number stored in the last dialed number memory when the second sequence is detected and a new telephone number has not been entered by the user.

17. The apparatus of claim 13, further comprising a display means for displaying the telephone number to be called.

18. A method used by a telephone for automatic execution of a telephone calling card call on a call by call basis using one of a plurality of carrier networks, the method comprising the steps of:

inputting by the user of at least one data set;

storing the at least one data set;

detecting the initiation of each telephone call by recognizing a first predetermined sequence entered by the user and alternately detecting the initiation of each calling card call by recognizing a second predetermined sequence entered by the user, the second predetermined sequence being different than the first predetermined sequence;

determining a telephone number to be called;

retrieving one of the at least one data sets in accordance with the detected second predetermined sequence; and automatically initiating a telephone call to the telephone number based on the retrieved data set responsive to entering of the second predetermined sequence by the user.

19. The method of claim 18, wherein the second predetermined sequence is different for each of a plurality of pairs of storage locations for storing the at least one data set.

20. The method of claim 18, wherein the step of determining a telephone number comprises the step of:

entering the telephone number to be called by the user;

storing the entered telephone number in a dialed digit memory;

storing at least one telephone number which previously had been dialed in a last dialed number memory; and wherein the step of determining a telephone number determines that the telephone number to be called is a previously dialed number stored in the last dialed number memory when the second sequence is detected and a new telephone number has not been entered by the user.

21. The apparatus of claim 18, wherein said at least one data set includes an access number, a verification data stream and at least one pause option command.

22. The method of claim 18, further comprising the step of displaying the telephone number to be called.

* * * * *